(12) United States Patent
Raghavan et al.

(10) Patent No.: US 11,196,462 B2
(45) Date of Patent: Dec. 7, 2021

(54) MULTI-LAYER BEAMFORMING IN MILLIMETER-WAVE MULTIPLE-INPUT/MULTIPLE-OUTPUT SYSTEMS

(71) Applicant: QUALCOMM Incorporated, San Diego, CA (US)

(72) Inventors: Vasanthan Raghavan, West Windsor, NJ (US); Sundar Subramanian, Bridgewater, NJ (US); Krishna Kiran Mukkavilli, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 15/188,502

(22) Filed: Jun. 21, 2016

(65) Prior Publication Data
US 2017/0244451 A1     Aug. 24, 2017

Related U.S. Application Data

(60) Provisional application No. 62/298,382, filed on Feb. 22, 2016.

(51) Int. Cl.
*H04B 7/0408* (2017.01)
*H04W 16/28* (2009.01)
(Continued)

(52) U.S. Cl.
CPC ......... *H04B 7/0408* (2013.01); *H04B 7/0413* (2013.01); *H04B 7/063* (2013.01);
(Continued)

(58) Field of Classification Search
CPC .. H04B 17/336; H04B 7/0408; H04B 7/0413; H04B 7/0452; H04B 7/0617;
(Continued)

(56) References Cited

U.S. PATENT DOCUMENTS

| 7,206,608 B1 | 4/2007 | Wu et al. |
| 8,385,310 B2 | 2/2013 | Hottinen et al. |
(Continued)

FOREIGN PATENT DOCUMENTS

| CN | 102711258 A | 10/2012 |
| CN | 104254981 A | 12/2014 |
(Continued)

OTHER PUBLICATIONS

ISA/EP, International Search Report and Written Opinion of the International Searching Authority, Int'l Application No. PCT/US2017/015331, dated Mar. 23, 2017, European Patent Office, Rijswijk, NL, 18 pgs.

*Primary Examiner* — Omer S Mian
*Assistant Examiner* — Bao G Nguyen
(74) *Attorney, Agent, or Firm* — Holland & Hart LLP

(57) ABSTRACT

Methods, systems, and devices for wireless communication are described. A base station may identify two (or more) beamforming directions associated with simultaneous communications to a set of receivers. Each receiver may be associated with a different one of the two beamforming directions. The base station may schedule resources for simultaneous communications with the set of receivers based on the identified two beamforming directions. The base station may schedule simultaneous transmissions to the set of receivers using the scheduled resources.

22 Claims, 11 Drawing Sheets

(51) Int. Cl.
*H04B 7/0413* (2017.01)
*H04B 7/06* (2006.01)
*H04B 17/336* (2015.01)
*H04L 7/04* (2006.01)
*H04W 72/04* (2009.01)
*H04B 7/0452* (2017.01)

(52) U.S. Cl.
CPC ......... *H04B 7/0617* (2013.01); *H04B 7/0632* (2013.01); *H04B 17/336* (2015.01); *H04L 7/04* (2013.01); *H04W 16/28* (2013.01); *H04W 72/046* (2013.01); *H04B 7/0452* (2013.01); *H04B 7/0628* (2013.01)

(58) Field of Classification Search
CPC .... H04B 7/0628; H04B 7/063; H04B 7/0632; H04L 7/04; H04W 16/28; H04W 72/046
See application file for complete search history.

(56) References Cited

U.S. PATENT DOCUMENTS

| | | | |
|---|---|---|---|
| 8,463,191 B2 | 6/2013 | Farajidana et al. | |
| 8,542,762 B2 | 9/2013 | Jin | |
| 8,818,443 B2 * | 8/2014 | Yamamoto | H04W 52/283 370/318 |
| 2003/0181163 A1 | 9/2003 | Ofuji et al. | |
| 2004/0114552 A1 | 6/2004 | Lim et al. | |
| 2005/0152314 A1 * | 7/2005 | Sun | H04L 25/0226 370/334 |
| 2006/0009244 A1 | 1/2006 | Schacht et al. | |
| 2006/0067269 A1 | 3/2006 | Jugl et al. | |
| 2007/0104152 A1 | 5/2007 | Wild et al. | |
| 2011/0228730 A1 | 9/2011 | Abraham et al. | |
| 2011/0261899 A1 | 10/2011 | Walton et al. | |
| 2012/0028630 A1 * | 2/2012 | Yamamoto | H04W 52/242 455/422.1 |
| 2014/0177683 A1 * | 6/2014 | Krishnamurthy | H04B 7/065 375/219 |
| 2014/0204871 A1 * | 7/2014 | Ode | H04L 5/005 370/329 |
| 2014/0334564 A1 * | 11/2014 | Singh | H04B 7/0617 375/267 |
| 2015/0085761 A1 * | 3/2015 | Maltsev | H04W 52/06 370/329 |
| 2015/0146812 A1 * | 5/2015 | Chu | H04W 72/0413 375/267 |
| 2015/0208332 A1 * | 7/2015 | Baghel | H04W 76/14 370/255 |
| 2015/0295695 A1 * | 10/2015 | Davydov | H04W 72/12 370/329 |
| 2016/0065286 A1 * | 3/2016 | Kim | H04B 7/0617 370/330 |
| 2016/0301466 A1 * | 10/2016 | Kinamon | H04B 7/2628 |
| 2017/0195938 A1 * | 7/2017 | Gomadam | H04B 7/086 |

FOREIGN PATENT DOCUMENTS

| | | |
|---|---|---|
| EP | 1876847 A1 | 1/2008 |
| WO | WO-2014177683 A1 | 11/2014 |

* cited by examiner

MULTI-LAYER BEAMFORMING IN MILLIMETER-WAVE MULTIPLE-INPUT/MULTIPLE-OUTPUT SYSTEMS

CROSS REFERENCES

The present Application for Patent claims priority to U.S. Provisional Patent Application No. 62/298,382 by Raghavan et al., entitled "Multi-Layer Beamforming in Millimeter-Wave Multiple-Input/Multiple-Output Systems," filed Feb. 22, 2016, assigned to the assignee hereof.

BACKGROUND

The following relates generally to wireless communications, and more specifically to multi-layer beamforming in millimeter-wave multiple-input/multiple-output systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

A UE may be configured to collaboratively communicate with multiple evolved node-Bs (eNB) through, for example, Multiple-Input/Multiple-Output (MIMO), Coordinated Multi-Point (CoMP), or other schemes. MIMO techniques use multiple antennas on the base stations or multiple antennas on the UE to take advantage of multipath environments to transmit multiple data streams. In other examples (e.g., in a next generation or 5G network), a wireless multiple access communication system may include a number of smart radio heads (RHs) in communication with a number of access node controllers (ANCs), where a set of one or more RHs, in communication with an ANC, defines an eNB. A base station or radio head may communicate with a set of UEs on downlink channels (e.g., for transmissions from a base station or RH to a UE) and uplink channels (e.g., for transmissions from a UE to a base station or RH). In some cases, base station antennas may be located within one or more antenna arrays, e.g., antenna array(s) within RHs. An eNB may use multiple antennas or antenna arrays to conduct beamforming operations for directional communications with a UE.

Conventional beamforming techniques, however, use different resources for different antennas or antenna arrays (also referred to as an "antenna port" or simply "port"). For example, different time-frequency resource elements (REs) are typically used with different antenna ports for reference signal transmission, communications, etc. Some examples include separating the REs using time-division or frequency-division multiplexing techniques. Such techniques generally rely on an analog approach to beamforming and do not optimize the utilization of available resources.

SUMMARY

The present disclosure relates to techniques for multi-layer beamforming in a millimeter-wave (mmW) multiple-input/multiple-output (MIMO) system. For example, the described techniques provide for an evolved NodeB (eNB), e.g., a mmW base station (MWB), to identify and select beamforming directions to be used for simultaneous communications to receivers. The receivers may correspond to multiple receive chains within a single user equipment (UE) (e.g., single-user MIMO (SU-MIMO)), or may correspond to a receiver chain for different UEs (e.g., multi-user MIMO (MU-MIMO)), or combinations of both features. The simultaneous communications may, in certain examples, utilize the same time-frequency resources, e.g., the same resource element (RE) for each beamforming direction. The eNB may identify the beamforming directions for the receivers based on performance metrics associated with each receiver, e.g., departure angles for transmissions or arrival angles for reception (at each receiver) of directional primary synchronization signals (DPSSs), a transmit power requirement associated with each receiver, etc. The eNB may identify the different beamforming directions for the receivers and schedule the resources for communications. In some examples, the eNB may perform interference cancellation or nulling techniques prior to scheduling and/or transmitting the simultaneous communications. Aspects of the present disclosure provide for reuse of REs for reference signal, communications, etc., which leads to more efficient system design with a higher system throughput and a lower overhead.

A method of wireless communication is described. The method may include determining at least two beamforming directions associated with simultaneous communications to a set of receivers, wherein each receiver of the set of receivers is associated with a different one of the at least two beamforming directions. The method may also include identifying a performance metric associated with each receiver of the set of receivers, wherein the performance metric is based on a transmit power metric associated with a signal-to-noise ratio (SNR) associated with each receiver and a beamforming direction metric associated with an angle of departure associated with communications to each receiver. The method may further include determining the at least two beamforming directions based on the performance metric associated with each receiver, scheduling resources for simultaneous communications with the set of receivers based on the identified at least two beamforming directions and scheduling simultaneous transmissions to the set of receivers using the scheduled resources.

An apparatus for wireless communication is described. The apparatus may include means for determining at least two beamforming directions associated with simultaneous communications to a set of receivers, wherein each receiver of the set of receivers is associated with a different one of the at least two beamforming directions. The apparatus may also include means for identifying a performance metric associated with each receiver of the set of receivers, wherein the performance metric is based on a transmit power metric associated with an SNR associated with each receiver and a beamforming direction metric associated with an angle of departure associated with communications to each receiver. The apparatus may further include means for determining the at least two beamforming directions based on the performance metric associated with each receiver, means for scheduling resources for simultaneous communications with the set of receivers based on the identified at least two beamforming directions and means for scheduling simultaneous transmissions to the set of receivers using the scheduled resources.

A further apparatus is described. The apparatus may include a processor, memory in electronic communication with the processor, and instructions stored in the memory. The instructions may be operable to cause the processor to determine at least two beamforming directions associated with simultaneous communications to a set of receivers, wherein each receiver of the set of receivers is associated with a different one of the at least two beamforming directions. The instructions may also be operable to cause the processor to identify a performance metric associated with each receiver of the set of receivers, wherein the performance metric is based on a transmit power metric associated with an SNR associated with each receiver and a beamforming direction metric associated with an angle of departure associated with communications to each receiver. The instructions may further be operable to cause the processor to determine the at least two beamforming directions based on the performance metric associated with each receiver, schedule resources for simultaneous communications with the set of receivers based on the identified at least two beamforming directions and schedule simultaneous transmissions to the set of receivers using the scheduled resources.

A non-transitory computer readable medium for wireless communication is described. The non-transitory computer-readable medium may include instructions to cause a processor to determine at least two beamforming directions associated with simultaneous communications to a set of receivers, where each receiver of the set of receivers is associated with a different one of the at least two beamforming directions. The instructions may also be operable to cause the processor to identify a performance metric associated with each receiver of the set of receivers, wherein the performance metric is based on a transmit power metric associated with an SNR associated with each receiver and a beamforming direction metric associated with an angle of departure associated with communications to each receiver. The instructions may further be operable to cause the processor to determine the at least two beamforming directions based on the performance metric associated with each receiver, schedule resources for simultaneous communications with the set of receivers based on the identified at least two beamforming directions and schedule simultaneous transmissions to the set of receivers using the scheduled resources.

Some examples of the method, apparatus, or non-transitory computer-readable medium described above may further include processes, features, means, or instructions for scheduling the same time and frequency resource for the simultaneous communications with each receiver of the set of receivers.

Some examples of the method, apparatus, or non-transitory computer-readable medium described above may further include processes, features, means, or instructions for transmitting a set of directional synchronization signals to a set of receivers from which the set of receivers is selected. Some examples of the method, apparatus, or non-transitory computer-readable medium described above may further include processes, features, means, or instructions for receiving, from each receiver of the set of receivers, a feedback message comprising communication parameters. Some examples of the method, apparatus, or non-transitory computer-readable medium described above may further include processes, features, means, or instructions for identifying the performance metric for each receiver based on the communication parameters.

Some examples of the method, apparatus, or non-transitory computer-readable medium described above may further include processes, features, means, or instructions for selecting the set of receivers from the set of receivers based on the performance metrics being within a predetermined range.

In some examples of the method, apparatus, or non-transitory computer-readable medium described above, the communication parameters comprise at least one of a beamforming direction index value associated with one or more directional synchronization signals, an SNR associated with each receiver, or combinations thereof.

In some examples of the method, apparatus, or non-transitory computer-readable medium described above, the communication parameters comprise at least one of a receiver chain count value, a channel quality indicator (CQI), a data rate requirement, or combinations thereof.

Some examples of the method, apparatus, or non-transitory computer-readable medium described above may further include processes, features, means, or instructions for reusing a same RE for transmitting the directional synchronization signals from a set of transmitter antenna ports.

In some examples of the method, apparatus, or non-transitory computer-readable medium described above, the performance metric is based on a difference in transmit power metric for each receiver being less than a first threshold value and based on a difference in beamforming direction metric being greater than a second threshold value.

Some examples of the method, apparatus, or non-transitory computer-readable medium described above may further include processes, features, means, or instructions for transmitting a scheduling message to each receiver of the set of receivers, the scheduling message comprising an indication of the scheduled resources.

In some examples of the method, apparatus, or non-transitory computer-readable medium described above, the scheduling message comprises a rank indicator (RI) associated with each receiver of the set of receivers.

Some examples of the method, apparatus, or non-transitory computer-readable medium described above may further include processes, features, means, or instructions for performing an interference cancellation procedure in beamforming prior to performing the simultaneous communications with the set of receivers.

In some examples of the method, apparatus, or non-transitory computer-readable medium described above, the set of receivers comprises at least two receive chains in a UE.

In some examples of the method, apparatus, or non-transitory computer-readable medium described above, the set of receivers comprises at least two UEs with at least one receiver chain per UE.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the

DETAILED DESCRIPTION

Techniques are described that support spatial separation and multiple radio frequency (RF) chain capabilities for multi-layer beamforming in a millimeter-wave (mmW) multiple-input/multiple-output (MIMO) communication system. The described techniques may be used in a single-user MIMO (SU-MIMO) environment (e.g., different beamforming directions directed to different receiver chains and/or antenna arrays of a user equipment (UE)) and/or in a multi-user MIMO (MU-MIMO) environment (e.g., different beamforming directions directed to different UEs). Aspects provide for multiple directional beamforming signals that are separated across multiple paths (e.g., beamformed in different directions) to a SU-MIMO UE and/or to MU-MIMO UEs. Broadly, the network access device (e.g., an evolved NodeB (eNB)) may estimate the dominant paths for different UEs (or a single UE with multiple receiver chains) and schedule multiple beamforming directions that are separated in the spatial/angular domain. The eNB may determine aspects of the beam directed to exciting the individual paths using pre-interference nulling, for example, and use the same resources for each path.

For example, an eNB may determine two (or more than two) beamforming directions for simultaneous communications to a set of receivers (e.g., SU-MIMO and/or MU-MIMO). Each beamforming direction may be associated with a different receiver. The eNB may schedule resources for the simultaneous communications with the set of receivers and schedule the simultaneous transmissions to the set of resources according to the scheduled resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

Figure 1:
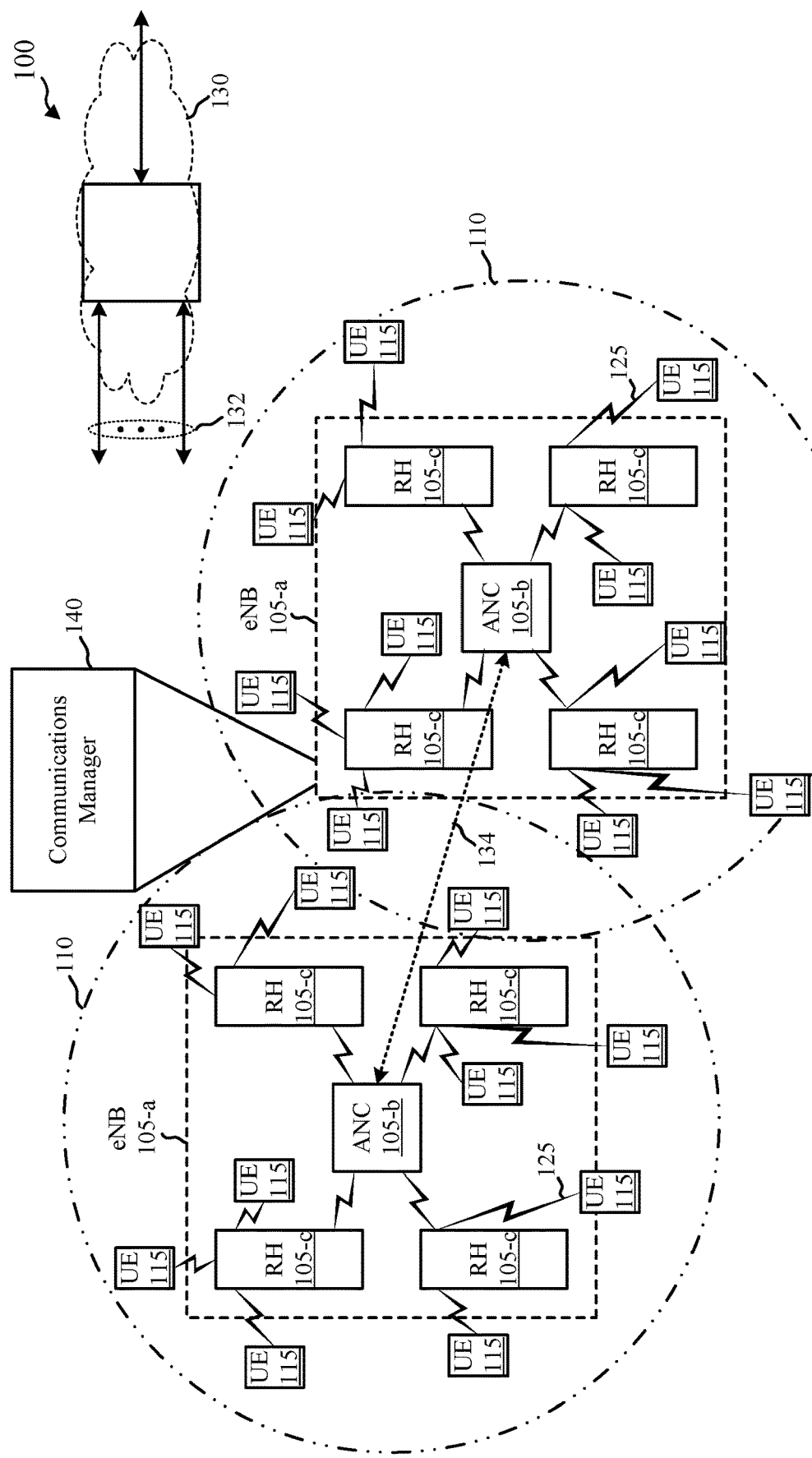
FIG. 1 illustrates an example of a wireless communications system that supports multi-layer beamforming in millimeter-wave multiple-input/multiple-output systems in accordance with aspects of the present disclosure.

FIG. 1 illustrates an example of a wireless communications system 100, in accordance with various aspects of the disclosure. The wireless communications system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-*a* or access node controllers (ANCs) 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (RHs) 105-*c*. In an alternative configuration of the wireless communication system 100, the functionality of an ANC 105-*b* may be provided by an RH 105-*c* or distributed across the RHs 105-*c* of an eNB 105-*a*. In another alternative configuration of the wireless communications system 100, the RHs 105-*c* may be replaced with base stations, and the ANCs 105—may be replaced by base station controllers (or links to the core network 130).

The ANCs 105-*b* may wirelessly communicate with the UEs 115 via one or more RHs 105-*c*, with each RH 105-*c* having one or more antennas. Each of the RHs 105-*c* may provide communication coverage for a respective geographic coverage area 110, and may provide one or more remote transceivers associated with an ANC 105-*b*. An RH 105-*c* may perform many of the functions of a Long Term Evolution (LTE) or LTE-Advanced (LTE-A) base station. In some examples, an ANC 105-*b* may be implemented in distributed form, with a portion of the ANC 105-*b* being provided in each RH 105-*c*. The geographic coverage area 110 for an RH 105-*c* may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNodeBs, etc. The wireless communications system 100 may include RHs 105-*c* (or base stations or other network access devices) of different types (e.g., macro cell and/or small cell network access devices). The geographic coverage areas 110 of the RHs 105-*c* or other network access devices may overlap. In some examples, different eNBs 105-*a* may be associated with different radio access technologies.

In some examples, the wireless communications system 100 may include a 5G network. In other examples, the wireless communications system 100 may include an LTE/LTE-A network. The wireless communications system 100 may in some cases be a heterogeneous network, in which different types of eNBs provide coverage for various geographical regions. For example, each eNB 105-*a* or RH 105-*c* may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the eNBs 105-a and/or RHs 105-c may have similar frame timing, and transmissions from different eNBs 105-a and/or RHs 105-c may be approximately aligned in time. For asynchronous operation, the eNBs 105-a and/or RHs 105-c may have different frame timings, and transmissions from different eNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, or other electronic device having a wireless communication interface. A UE 115 may be able to communicate with various types of eNBs 105-a, RHs 105-c, base stations, access points, or other network access devices, including macro eNBs, small cell eNBs, relay base stations, and the like. A UE 115 may also be able to communicate directly with other UEs (e.g., using a peer-to-peer (P2P) protocol).

The communication links 125 shown in wireless communications system 100 may include uplink (UL) channels from a UE 115 to an RH 105-c, and/or downlink (DL) channels, from an RH 105-c to a UE 115. The downlink channels may also be called forward link channels, while the uplink channels may also be called reverse link channels.

Each communication link 125 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the RHs 105-c and/or UEs 115 may include multiple antennas for employing antenna diversity schemes to improve communication quality and reliability between RHs 105-c and UEs 115. Additionally or alternatively, RHs 105-c and/or UEs 115 may employ MIMO techniques that may take advantage of multi-path environments to transmit multiple spatial layers carrying the same or different coded data.

The wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, wireless communications system 100 may operate in an ultra-high frequency (UHF) region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beam forming). However, EHF transmissions may be subject to even greater atmospheric attenuation and shorter range than UHF transmissions.

One or more of the network access devices 105 may include a communication manager 140. In some examples, the communication manager 140 may be used to determine at least two beamforming directions associated with simultaneous communications to a set of receivers (e.g., different receive chains of a UE 115 and/or different UEs 115). Each receiver in the set of receivers may be associated with a different beamforming direction. The communication manager 140 may also be used to schedule resources for the simultaneous communications with the set of receivers according to the at least two beamforming directions. The communications manager 140 may schedule the same time/frequency resources for the communications. The communications manager 140 may also be used to schedule the simultaneous transmissions to the set of receivers using the scheduled resources. Aspects of the communications manager 140 may be implemented across an eNB 105-a, an ANC 105-b, and/or an RH 105-c.

Figure 2:
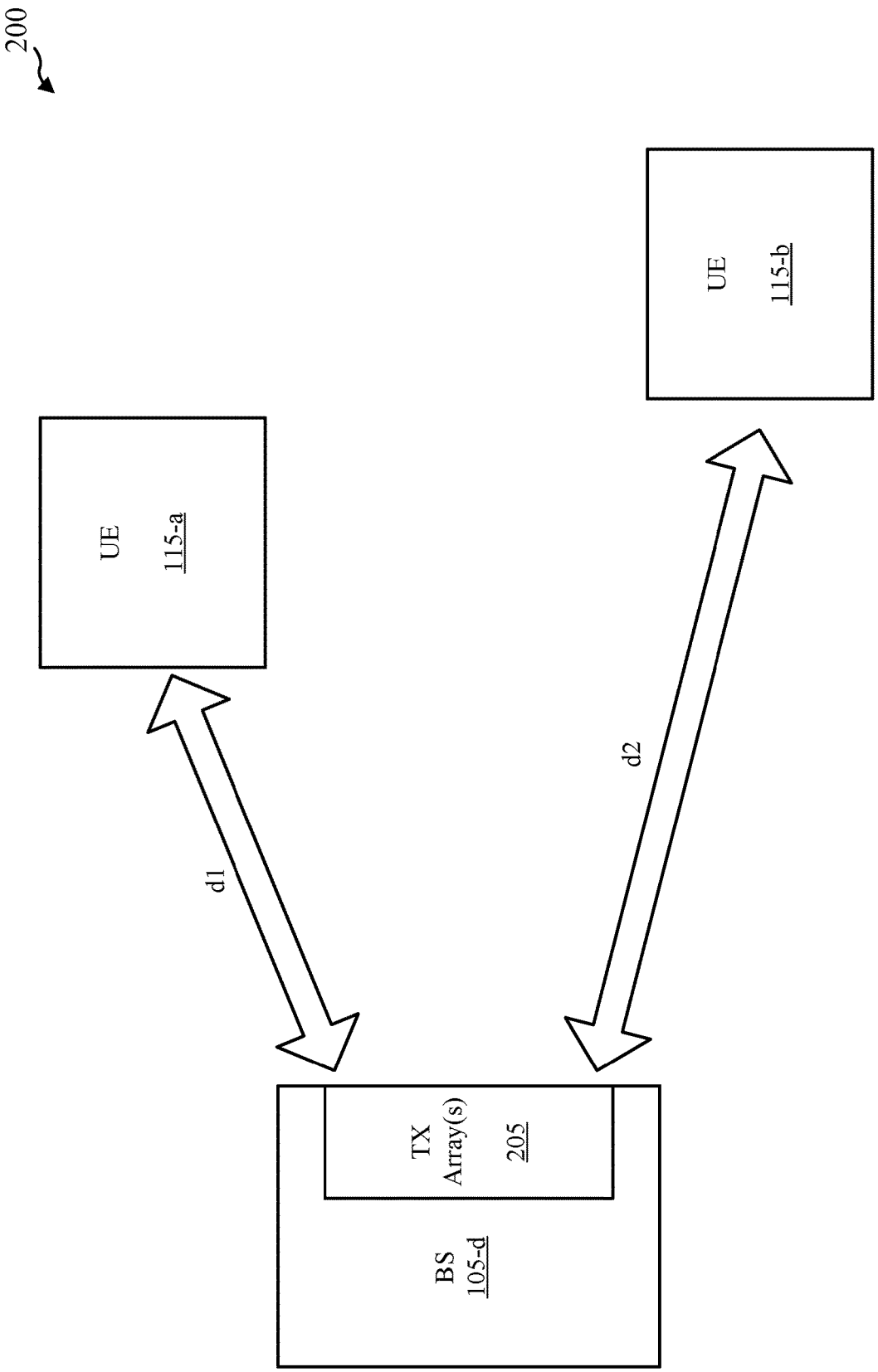
FIG. 2 illustrates a diagram of an example of a wireless communications system that supports multi-layer beamforming in millimeter-wave multiple-input/multiple-output systems in accordance with aspects of the present disclosure.

FIG. 2 illustrates an example of a wireless communications system 200 for multi-layer beamforming in millimeter-wave multiple-input/multiple-output systems. Wireless communications system 200 may include base station 105-d, UE 115-a, and UE 115-b, which may be examples of the corresponding devices described with reference to FIG. 1. For example, base station 105-d may include aspects of a network access device 105 (e.g., eNBs 105-a, ANCs 105-b, or RHs 105-c) described with reference to FIG. 1. Base station 105-d may include at least one antenna array 205, which may be an example of an RH 105-c, an eNB 105-a, etc. Generally, the antenna array 205 may include one or more antennas (ports) that can be used for simultaneous transmissions in different beamforming directions.

Generally, multi-layer beamforming may refer to the base station 105-d transmitting beamformed signals in at least two different beamforming directions (e.g., signals transmitted at different angles or along different paths). For example, the base station 105-d may transmit a beamformed signal in a first layer consisting of direction "d1" directed to UE 115-a and another beamformed signal in a second layer consisting of direction "d2" directed to UE 115-b. As previously discussed, the example wireless communications system 200 illustrates a MU-MIMO environment where UEs 115-a and 115-b constitute the set of receivers. The beamformed transmissions may be for simultaneous communications with the set of receivers.

Base station 105-d may support the described techniques for multi-layer beamforming. In some aspects, base station 105-d may transmit directional synchronization signals (e.g., DPSSs) over Nbeams to all of the UEs within its coverage area, e.g., to UEs 115-a and 115-b. Each DPSS beam may be referred to as $f_{DPSS,1}, \ldots f_{DPSS,N}$, where N refers to the total number of DPSS beam directions. Each DPSS signal may be transmitted in a specific beamformed direction and the base station 105-d may transmit such DPSS signals in a circular fashion to provide comprehensive coverage within its coverage area. Each transmitted DPSS may include information identifying the beamforming direction of transmission, the base station 105-d identity, etc. Base station 105-d may use antenna array 205, alone or in cooperation with other antenna arrays, to transmit the DPSS in the described beamformed manner. The base station 105-d may utilize the same time/frequency domain and resources for the DPSS transmissions (e.g., the same resource elements (REs)), for DPSS transmission across all antenna ports. Reusing the same REs for multiple antenna ports reduces pilot signal overhead and provides a more efficient system design (e.g., higher throughput rates, lower latency, improved security, etc.).

UE 115 within the coverage area may receive a DPSS signal over M beams. M may refer to the number of beams over which each transmitted DPSS signal is combined, e.g., the UE 115 (e.g., UE$_1$ which may be an example of UE 115-a and/or UE 115-b) may step through a set of combining beams denoted as $g_{DPSS,1}, \ldots g_{DPSS,M}$. For each received DPSS signal, the UEs 115 may determine the angle of departure and arrival of the DPSS signal, the received signal strength, the signal-to-interference noise ratio (SNR), etc. A UE 115 receiving more than one DPSS signal may determine the beam directions at the eNB side and the UE side that are best suited for communications, e.g., has the highest received signal strength, the least interference, supports the highest modulation and coding scheme (MCS), etc.

Each UE 115, e.g., UEs 115-a and 115-b, may then transmit feedback information or messages to base station 105-d. The feedback messages may include an index of the best beam for transmission, e.g., the beam best suited for communications, to the base station 105-d. The feedback message may also include SNR information determined for each received DPSS beam. The feedback information may be transmitted using a random access channel (RACH), in some examples. UEs 115 may also transmit information relating to its rate requirements, the number of RF chains the UE 115 has for reception, channel quality metrics associated with multi-layer beamforming, and angle of departure or arrival for the received DPSS beam. In one example, UE$_1$ may transmit feedback messages in a reverse link time-slot reserved for beam $i_1$ with combiner $g_{DPSS,j1}$ where $(i_1,j_1)=\text{argmax}_{i=1, \ldots N, j=1, \ldots ,M} |g_{DPSS,j}{}^{H} H_1 f_{DPSS,i}|^2$ where H1 refers to the channel matrix between the eNB and UE$_1$. In some examples, UE$_1$ may include in the feedback message SNR information based on the described functions.

Base station 105-d may then determine at least two beamforming directions (or beamforming vectors that need not correspond to directions) for a set of receivers for simultaneous communications. Each beamforming direction/vector may be different for each receiver. Generally, the selected beamforming directions/vectors may use separation in the spatial/angular/beamspace domain to minimize or eliminate interference between the beams. In some aspects, the base station 105-d may determine a performance metric associated with each receiver providing feedback information. The base station 105-d may determine the beamforming directions based on the performance metrics for the set of receivers, e.g., performance metrics being within a predetermined range, etc.

The performance metric may be based, at least in part, on the feedback messages received from the UEs 115, e.g., channel quality indicator metrics, angle of arrival or departure, rate requirements, etc., for each UE 115. For example, UEs 115 having a similar rate requirement may be included in the set of receivers. In some aspects, the performance metric may be based on user throughput, system throughput, latency, SNR, and the like.

The performance metric may also be based on a transmit power metric. For example, the base station 105-d may determine a maximum available transmit power and identify UEs 115 having a similar transmit power requirement. The base station 105-d may select UEs 115 for the set of receivers based on UEs 115 having a similar transmit power requirement where the total transmit power to the set of receivers is within the maximum available transmit power.

In one non-limiting example, the performance metric used to select UEs 115 for the set of receivers may include $A_i = \{j: |\text{AoD}(\emptyset_{UEi}) - \text{AoD}(\emptyset_{UEj})| > \emptyset_{min}$ and $|P_{dom,UEi} - P_{dom,UEj}| < P_{max}\}$, wherein AoD refers to the angle of departure for a dominant path to a certain UE and $P_{dom}$ refers to a transmit power requirement associated with that path. An admissible set of receivers may include a random UE from $A_i$ that is eligible to be scheduled for simultaneous transmissions with $UE_i$. For example, the best UE from $A_i$ that maximizes (may be weighted) sum-rate (or an appropriate network performance metric) is scheduled with $UE_i$.

The base station 105-d may select the UEs 115 for the set of receivers, e.g., UEs 115-a and 115-b, and schedule the resources for the simultaneous communications to the set of receivers. The base station 105-d may schedule the same resources for the simultaneous communications to the set of receivers, e.g., the same time resources/domain and/or the same frequency resources/domain. The base station 105-d may convey the scheduled resource information to the UEs 115 in the set of receivers. For example, the base station 105-d may transmit a scheduling message that conveys the scheduled resources. The base station 105-d may also identify a rank indicator associated with each UE 115 in the set of receivers and convey this rank indicator to the set of receivers. The rank indicator may be based on the feedback metric, for example. The base station 105-d may schedule the simultaneous transmissions to the set of receivers using the scheduled resources.

In some examples, the base station 105-d may perform interference cancellation in beamforming prior to performing the simultaneous communications. For example and in a MU-MIMO environment, the base station 105-d may utilize a beam steering scheme, a zeroforcing scheme, a generalized eigenvector scheme, and the like to perform the interference cancellation prior to transmission. The beam steering scheme may include the base station 105-d beamforming along $f_{DPSS,i1}$ for $UE_1$, along $f_{DPSS,i2}$ for $UE_2$, and so forth. A zeroforcing scheme may include the base station 105-d, based on assuming a perfect combining at each UE 115, and producing a rank-1 approximation of "transmit eigen-space of channel" at $UE_1$ and $UE_2$. The base station 105-d may obtain unit-normal columns of pseudo-inverse of combined channel approximation for beamforming vectors. The zeroforcing scheme may be based on $$f_1 = \frac{f_{PRE,1}}{\|f_{PRE,1}\|} \text{ where } f_{PRE,1} = f_{DPSS,i_1} - (f_{DPSS,i_2}^H f_{DPSS,i_1}) f_{DPSS,i_2}.$$

The generalized eigenvector scheme may include the base station 105-d approximating the objective function using the same assumptions as in the zeroforcing scheme and based on $$f_1 = \frac{f_{PRE,1}}{\|f_{PRE,1}\|} \text{ where } f_{PRE,1} = f_{DPSS,i_1} + \alpha * (f_{DPSS,i_2}^H f_{DPSS,i_1}) f_{DPSS,i_2}$$

for an appropriate choice of $\alpha$ (obtained based on the optimization scenario concerned, in some examples).

The base station 105-d may perform the simultaneous communications using the scheduled resource and according to the scheduled transmissions to the set of receivers. The UEs 115-a and 115-b may use the information included in the scheduling message to receive the transmissions.

Figure 3:
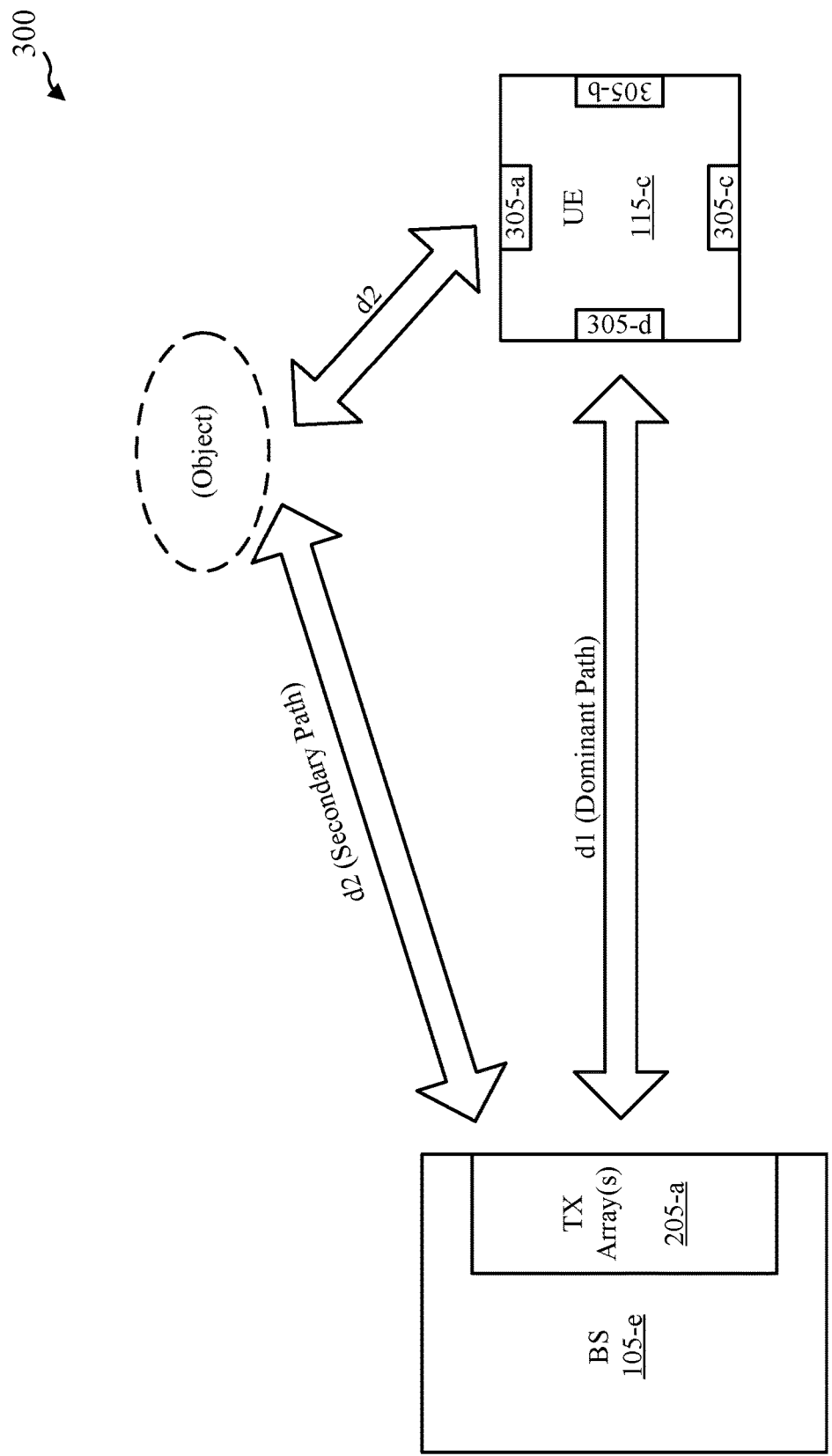
FIG. 3 illustrates a diagram of an example of a wireless communications system that supports multi-layer beamforming in millimeter-wave multiple-input/multiple-output systems in accordance with aspects of the present disclosure.

FIG. 3 illustrates an example of a wireless communications system 300 for multi-layer beamforming in millimeter-wave multiple-input/multiple-output systems. Wireless communications system 300 may include base station 105-e and UE 115-c, which may be examples of the corresponding devices described with reference to FIGS. 1 and/or 2. For example, base station 105-e may include aspects of a network access devices 105 (e.g., eNBs 105-a, ANCs 105-b, or RHs 105-c) described with reference to FIG. 1. Base station 105-e may include at least one antenna array 205-a, which may be an example of the antenna array 205 of FIG. 2. Generally, the antenna array 205-a may include one or more antennas (ports) that may be used for simultaneous transmissions in different beamforming directions.

Generally, wireless communications system 300 illustrates an example of a SU-MIMO environment that supports multi-layer beamforming to more than one receive chain in a UE. For example, UE 115-c may include more than one antenna array 305 (e.g., antenna arrays 305-a, 305-b, 305-c, 305-d) with each antenna array being located at a different position on UE 115-c. Each antenna array may be associated with a different receiver chain of the UE 115-c and therefore the UE 115-c may support receiving two different signals simultaneously. As discussed with reference to FIG. 2, the UE 115-c may provide feedback messages to base station 105-e based on received DPSS transmissions along different beams. The feedback messages may include a beam index indicative of which beam direction is best suited for communications, which beam direction is next best suited for communications, and so forth. In the example of FIG. 3, the UE 115-c feedback message may indicate that the UE 115-c received a best beam direction along dominant path "d1" and a second best beam direction along secondary path "d2." The secondary path d2 may include, in some examples, an indirect path where the beam is reflected off an object. It is to be understood that the secondary path d2 may be indirect due to other factors, e.g., environmental conditions.

Thus, in the example wireless communications system 300 the base station 105-e may select the set of receivers that include two receive chains of UE 115-c, each receive chain being associated with a different beamforming direction. The base station 105-e may then determine the beamforming directions, schedule the resources, and schedule the transmissions for simultaneous transmissions to the set of receivers (receiver chains of UE 115-c in this example). The base station 105-e may transmit the two beamformed signals to the receiver chains of UE 115-c, the first signal along the dominant path d1 and the second signal along secondary path d2.

Figure 4:
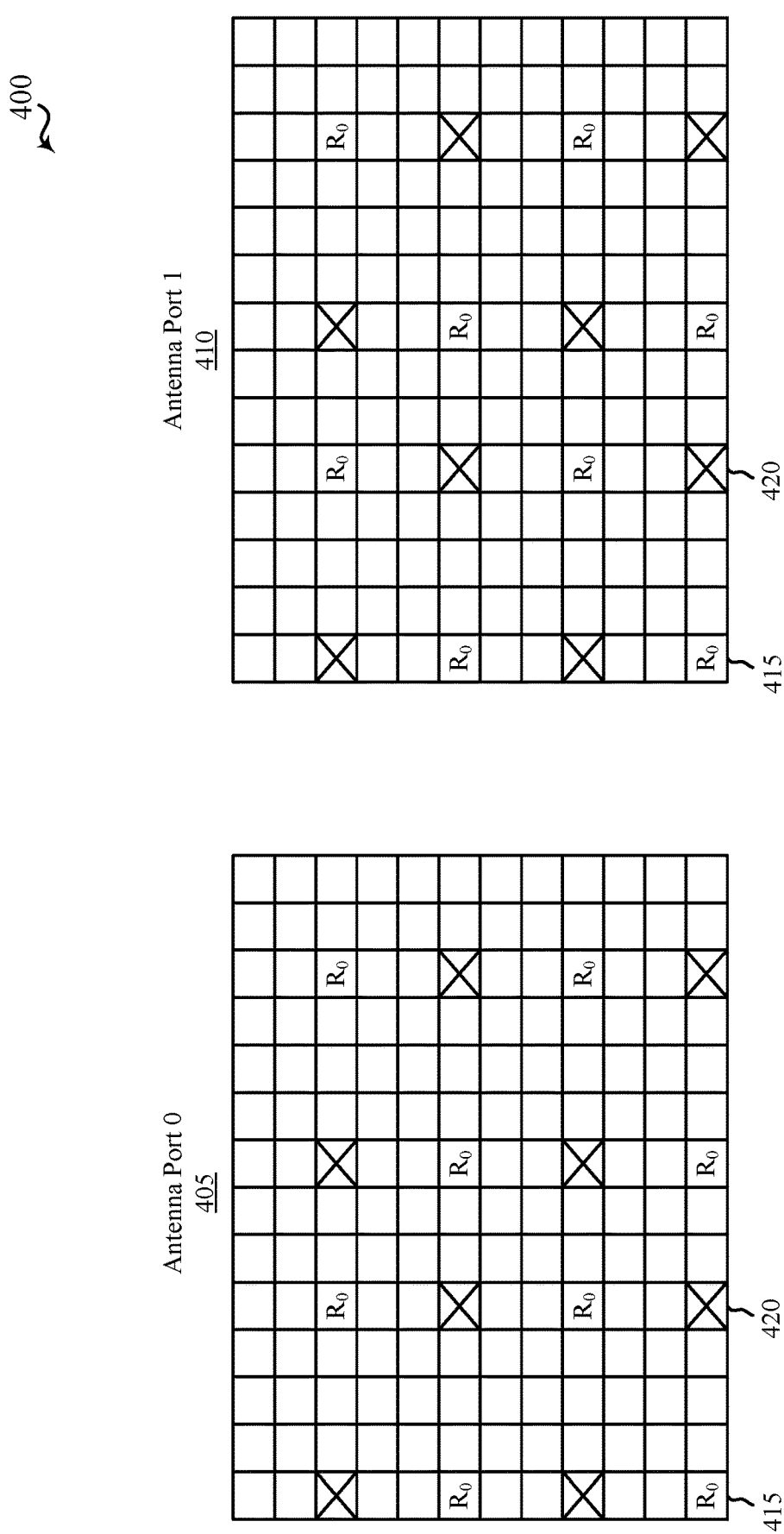
FIG. 4 illustrates an example of aspects of a system that supports multi-layer beamforming in millimeter-wave multiple-input/multiple-output systems in accordance with aspects of the present disclosure.

FIG. 4 illustrates a diagram 400 showing examples of aspects of a system that supports multi-layer beamforming in millimeter-wave multiple-input/multiple-output systems. Diagram 400 may be implemented by a base station, such as a network access devices 105 (e.g., eNBs 105-a, ANCs 105-b, RHs 105-c, or base stations 105-d, 105-e) described with reference to FIGS. 1-3. Generally, the diagram 400 illustrates aspects of a network access device 105 utilizing the same resources for reference signal transmissions.

For example, a network access device 105 may include antenna port 0 (identified as port 405) and a second antenna port 1 (identified as port 410). Each port may be used for directional beamforming transmissions. Generally, the network access device 105 may transmit reference signals for the above-described beamforming directions where the beamforming directions for the set of receivers are such that mutual interference among the beams is minimal. For the pilot signal structure (shown in diagram 400) and the data communications, the network access device 105 may use the same time-frequency resources across the identified beamforming directions without the need for separation in time, frequency, or code domains.

In diagram 400, network access device 105 may use the same resource elements (REs) 415 for reference signal transmission across the antenna ports (e.g., port 405 and port 410). The REs 420 illustrate REs that may not be used for transmission on either port, dependent upon base station determination. Thus, over-the-air resource usage may be efficient with respect to conventional reference signal transmission and overall system performance may be improved.

Figure 5:
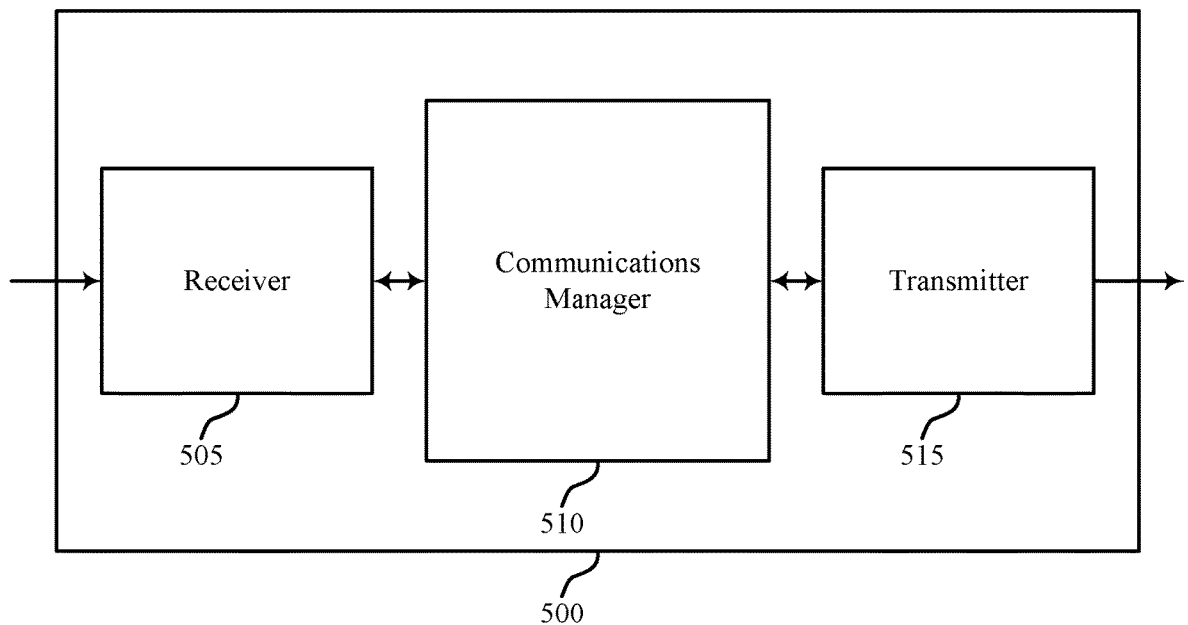
FIGS. 5 through 7 show block diagrams of an apparatus that supports multi-layer beamforming in millimeter-wave multiple-input/multiple-output systems in accordance with aspects of the present disclosure.

FIG. 5 shows a block diagram of an apparatus 500 that supports multi-layer beamforming in millimeter-wave multiple-input/multiple-output systems in accordance with various aspects of the present disclosure. Apparatus 500 may be an example of aspects of a network access device 105 (e.g., eNBs 105-a, ANCs 105-b, or RHs 105-c) or base station 105-d, 105-e as described with reference to FIGS. 1-3. Apparatus 500 may include receiver 505, communications manager 510 and transmitter 515. Apparatus 500 may also include a processor. Each of these components may be in communication with each other.

The receiver 505 may receive information such as packets, user data, or control information associated with various information channels (e.g., control channels, data channels, and information related to multi-layer beamforming in millimeter-wave multiple-input/multiple-output systems, etc.). Information may be passed on to other components of the device. The receiver 505 may be an example of aspects of the transceiver 825 described with reference to FIG. 8.

The communications manager 510 may determine at least two beamforming directions associated with simultaneous communications to a set of receivers, where each receiver of the set of receivers is associated with a different one of the at least two beamforming directions, schedule resources for simultaneous communications with the set of receivers based on the identified at least two beamforming directions, and schedule simultaneous transmissions to the set of receivers using the scheduled resources. The communications manager 510 may also be an example of aspects of the communications manager 140 and/or 805 described with reference to FIGS. 1 and 8, respectively.

The transmitter 515 may transmit signals received from other components of apparatus 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or in accordance with aspects of the present disclosure it may include a plurality of antennas.

Figure 6:
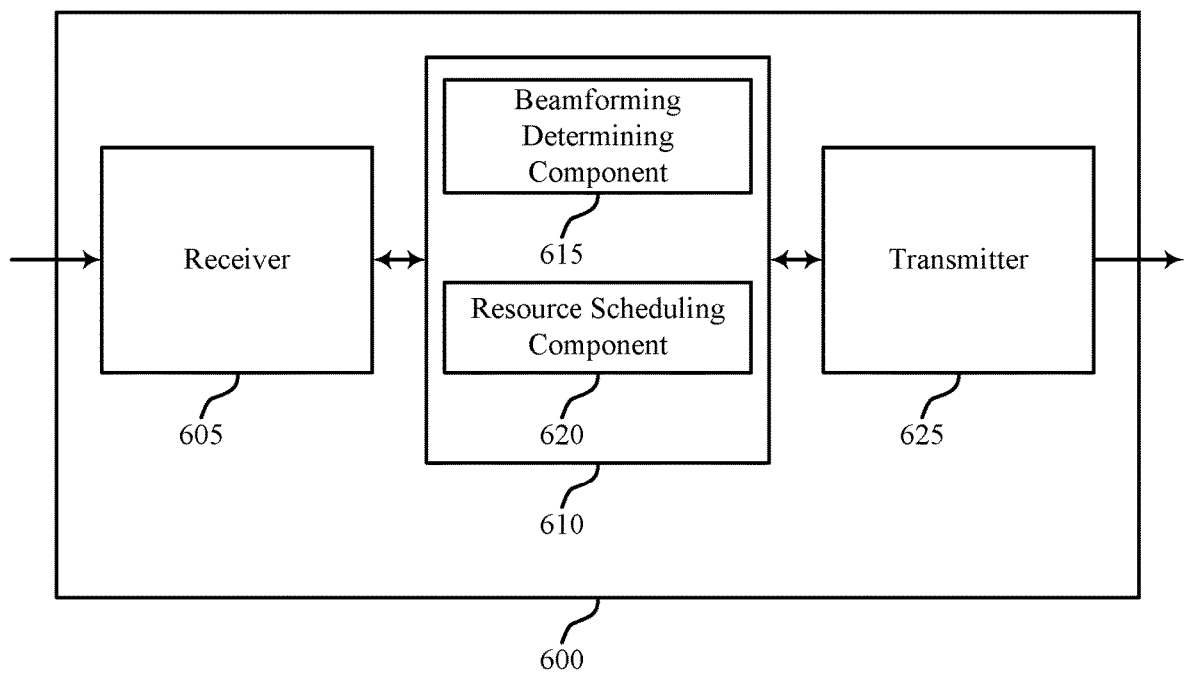

FIG. 6 shows a block diagram of an apparatus 600 that supports multi-layer beamforming in millimeter-wave multiple-input/multiple-output systems in accordance with various aspects of the present disclosure. Apparatus 600 may be an example of aspects of a network access devices 105 (e.g., eNBs 105-a, ANCs 105-b, or RHs 105-c) or a base station 105-d, 105-e described with reference to FIGS. 1-3. Apparatus 600 may include receiver 605, communications manager 610, and transmitter 625. Apparatus 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The communications manager 610 may be an example of aspects of communications manager 510 described with reference to FIG. 5. The communications manager 610 may include beamforming determining component 615 and resource scheduling component 620. The communications manager 610 may be an example of aspects of the communications manager 140 and/or 805 described with reference to FIGS. 1 and 8, respectively.

The beamforming determining component 615 may determine the beamforming direction for each receiver based on the performance metric, and determine at least two beamforming directions associated with simultaneous communications to a set of receivers, where each receiver of the set of receivers is associated with a different one of the at least two beamforming directions. In some cases, the set of receivers comprises at least two receive chains in a UE. In some cases, the set of receivers comprises at least two UEs with at least one receiver chain per UE.

The resource scheduling component 620 may schedule resources for simultaneous communications with the set of receivers based on the identified at least two beamforming directions, schedule simultaneous transmissions to the set of receivers using the scheduled resources, transmit a scheduling message to each receiver of the set of receivers, the scheduling message comprising an indication of the scheduled resources, and schedule the same time and frequency resource for the simultaneous communications with each receiver of the set of receivers. In some cases, the scheduling message comprises a rank indicator associated with each receiver of the set of receivers.

The transmitter 625 may transmit signals received from other components of apparatus 600. In some examples, the transmitter 625 may be collocated with a receiver in a transceiver module. For example, the transmitter 625 may be an example of aspects of the transceiver 825 described with reference to FIG. 8. The transmitter 625 may utilize a single antenna, or in accordance with aspects of the present disclosure it may utilize a plurality of antennas.

Figure 7:
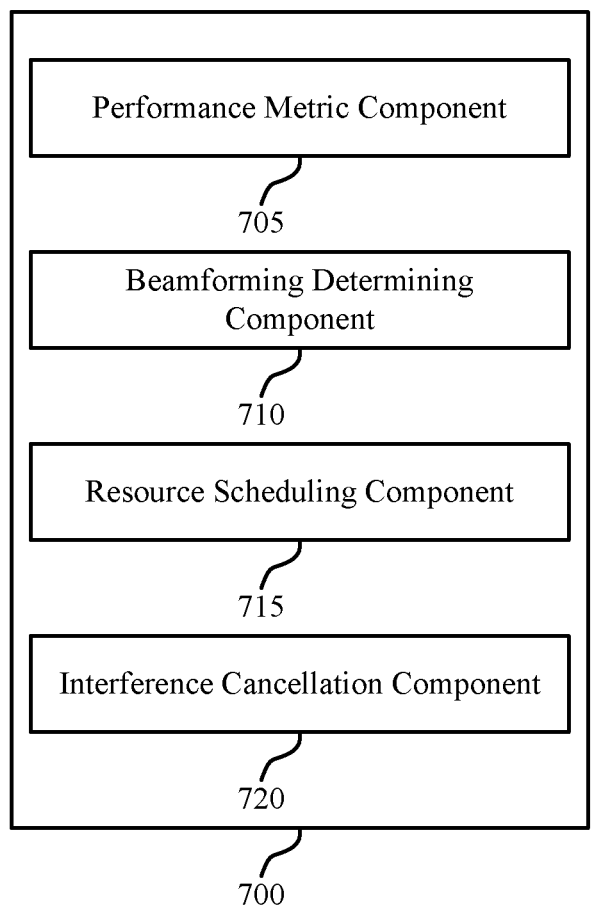

FIG. 7 shows a block diagram of a communications manager 700 which may be an example of the corresponding component of apparatus 500 or apparatus 600. That is, communications manager 700 may be an example of aspects of communications manager 510 or communications manager 610 described with reference to FIGS. 5 and 6. The communications manager 700 may also be an example of aspects of the communications manager 140 and/or 805 described with reference to FIGS. 1 and 8, respectively.

The communications manager 700 may include performance metric component 705, beamforming determining component 710, resource scheduling component 715 and interference cancellation component 720. Each of these modules may communicate, directly or indirectly, with one another (e.g., via one or more buses).

The performance metric component 705 may identify a performance metric associated with each receiver of the set of receivers, transmit a set of directional synchronization signals to a set of receivers from which the set of receivers is selected, receive, from each receiver of the set of receivers, a feedback message comprising communication parameters, identify the performance metric for each receiver based on the communication parameters, select the set of receivers from the set of receivers based on the performance metrics being within a predetermined range, determine appropriate beamforming vectors for simultaneous transmissions, and reuse a same resource element for transmitting the directional synchronization signals from a set of transmitter antenna ports. In some cases, the communication parameters comprise at least one of a beamforming direction index value associated with one or more directional synchronization signals, an SNR associated with each receiver, or combinations thereof. In some cases, the communication parameters comprise at least one of a receiver chain count value, a channel quality indicator (CQI), a data rate requirement, or combinations thereof. In some cases, the performance metric is further based on at least one of a transmit power metric associated with a SNR associated with each receiver, a beamforming direction metric associated with an angle of departure associated with communications to each receiver, or combinations thereof. In some cases, the performance metric is based on a difference in transmit power metric for each receiver being less than a first threshold value and based on a difference in beamforming direction metric being greater than a second threshold value, as described below with respect to the equation $A_i=\{j:|AoD(\emptyset_{UEi})-AoD(\emptyset_{UEj})|>\emptyset_{min}$ and $|P_{dom,UEi}-P_{dom,UEj}|<P_{max}\}$, wherein AoD refers to the angle of departure of a dominant path to a UE and $P_{dom}$ refers to a transmit power requirement associated with that path.

The beamforming determining component 710 may determine the beamforming direction for each receiver based on the performance metric, and determine at least two beamforming directions/vectors associated with simultaneous communications to a set of receivers, where each receiver of the set of receivers is associated with a different one of the at least two beamforming directions/vectors. In some cases, the set of receivers comprises at least two receive chains in a UE. In some cases, the set of receivers comprises at least two UEs with at least one receiver chain per UE.

The resource scheduling component 715 may transmit a scheduling message to each receiver of the set of receivers, the scheduling message comprising an indication of the scheduled resources, schedule resources for simultaneous communications with the set of receivers based on the identified at least two beamforming directions/vectors, schedule simultaneous transmissions to the set of receivers using the scheduled resources, and schedule the same time and frequency resource for the simultaneous communications with each receiver of the set of receivers. In some cases, the scheduling message comprises a rank indicator associated with each receiver of the set of receivers.

The interference cancellation component 720 may perform an interference cancellation procedure in beamforming prior to performing the simultaneous communications with the set of receivers. For example, the interference cancellation component 720 may utilize a beam steering scheme, a zeroforcing scheme, a generalized eigenvector scheme, and the like to perform the interference cancellation prior to transmission, as described above.

Figure 8:
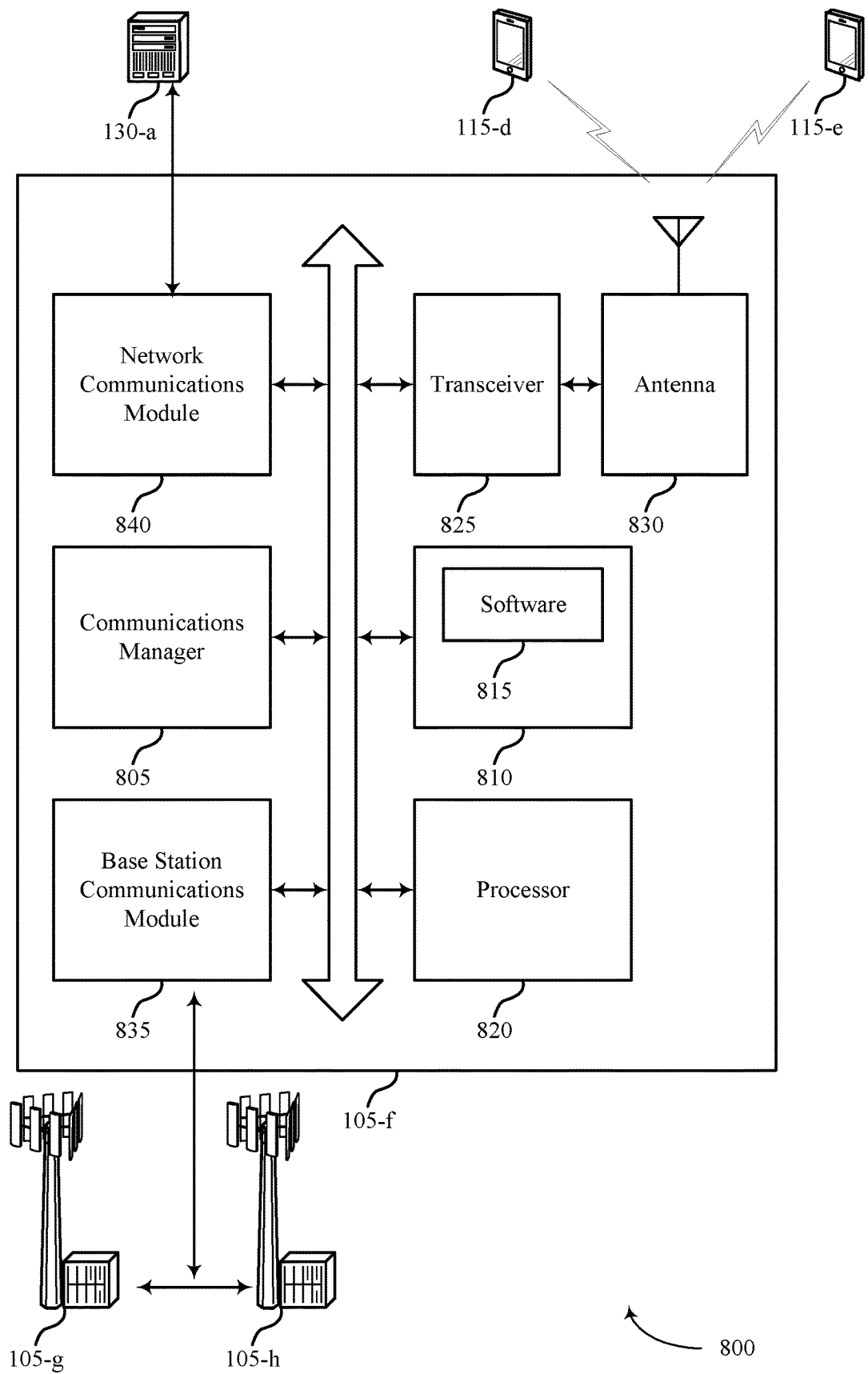
FIG. 8 illustrates a block diagram of a system including an evolved NodeB (eNB) multi-layer beamforming in millimeter-wave multiple-input/multiple-output systems in accordance with aspects of the present disclosure.

FIG. 8 shows a diagram of a wireless system 800 including a device configured that supports multi-layer beamforming in millimeter-wave multiple-input/multiple-output systems in accordance with various aspects of the present disclosure. For example, system 800 may include base station 105-f, which may be an example of an apparatus 500, an apparatus 600, a network access devices 105 (e.g., eNBs 105-a, ANCs 105-b, or RHs 105-c), or a base station 105-d, 105-e as described with reference to FIGS. 1 through 3 and 5 through 7. Base station 105-f may also include components for bi-directional voice and data communications including components for transmitting communications and components for receiving communications. For example, base station 105-f may communicate bi-directionally with one or more UEs 115.

Base station 105-f may also include communications manager 805, memory 810, processor 820, transceiver 825, antenna 830, base station communications module 835 and network communications module 840. Each of these modules may communicate, directly or indirectly, with one another (e.g., via one or more buses).

The communications manager 805 may be an example of a communications manager as described with reference to FIGS. 1 through 3 and 5 through 7.

The memory 810 may include random access memory (RAM) and read only memory (ROM). The memory 810 may store computer-readable, computer-executable software 815 including instructions that, when executed, cause the processor 820 to perform various functions described herein (e.g., multi-layer beamforming in millimeter-wave multiple-input/multiple-output systems, etc.). In some cases, the software 815 may not be directly executable by the processor 820 but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station (for example, base station 105-g or base station 105-h) or a UE 115. The transceiver 825 may also include a modem to modulate the packets and provide the modulated packets to the antennas for transmission, and to demodulate packets received from the antennas.

In some cases, the base station 105-f may include more than one antennas 830, which may be capable of concurrently transmitting or receiving multiple wireless transmissions.

The base station communications module 835 may manage communications with other base stations (e.g., base stations 105-g or 105-h), and may include a controller or scheduler for controlling communications with UEs 115 in cooperation with other base stations. For example, the base station communications module 835 may coordinate scheduling for transmissions to UEs 115 for various interference mitigation techniques such as beamforming or joint transmission. In some examples, base station communications module 835 may provide an X2 interface within an LTE/LTE-A wireless communication network technology to provide communication between base stations.

The network communications module 840 may manage communications with the core network (e.g., via one or more wired backhaul links). For example, the network communications module 840 may manage the transfer of data communications for client devices, such as one or more UEs 115.

Figure 9:
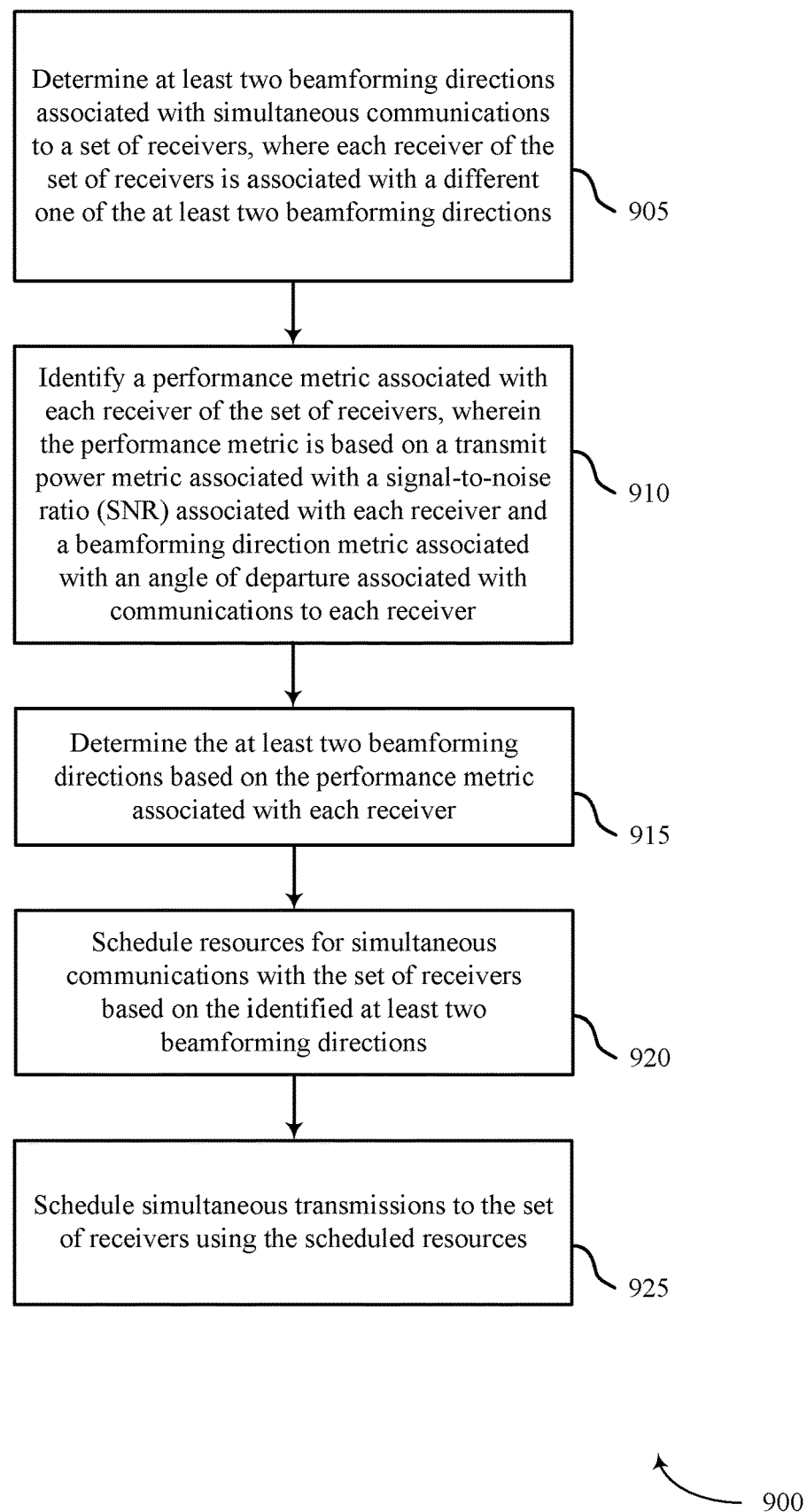
FIGS. 9 through 11 illustrate methods for multi-layer beamforming in millimeter-wave multiple-input/multiple-output systems in accordance with aspects of the present disclosure.

FIG. 9 shows a flowchart illustrating a method 900 for multi-layer beamforming in millimeter-wave multiple-input/multiple-output systems in accordance with various aspects of the present disclosure. The operations of method 900 may be implemented by a device such as a network access devices 105 (e.g., eNBs 105-a, ANCs 105-b, or RHs 105-c) and/or a base station 105-d, 105-e or its components as described with reference to FIGS. 1 through 3. For example, the operations of method 900 may be performed by the communications manager as described herein. In some examples, the network access device 105 (such as an eNB 105-a, an ANC 105-b, and/or an RH 105-c) may execute a set of codes to control the functional elements of the device to perform the functions described below. Additionally or alternatively, the network access device 105 may perform aspects the functions described below using special-purpose hardware.

At block 905, the network access device 105 may determine at least two beamforming directions associated with simultaneous communications to a set of receivers, where each receiver of the set of receivers is associated with a different one of the at least two beamforming directions as described above with reference to FIGS. 2 through 4. In certain examples, the operations of block 905 may be performed by the beamforming determining component as described with reference to FIGS. 6 and 7.

At block 910, the network access device 105 may identify a performance metric associated with each receiver of the set of receivers. The performance metric may be based on a transmit power metric associated with an SNR associated with each receiver, and a beamforming direction metric associated with an angle of departure associated with communications to each receiver, as described above with reference to FIGS. 2 through 4. In certain examples, the operations of block 910 may be performed by the performance metric component as described with reference to FIGS. 6 and 7.

At block 915, the network access device 105 may determine the at least two beamforming directions based on the performance metric associated with each receiver, as described above with reference to FIGS. 2 through 4. In certain examples, the operations of block 915 may be performed by the beamforming determining component as described with reference to FIGS. 6 and 7.

At block 920, the network access device 105 may schedule resources for simultaneous communications with the set of receivers based on the identified at least two beamforming directions as described above with reference to FIGS. 2 through 4. In certain examples, the operations of block 920 may be performed by the resource scheduling component as described with reference to FIGS. 6 and 7.

At block 925, the network access device 105 may schedule simultaneous transmissions to the set of receivers using the scheduled resources as described above with reference to FIGS. 2 through 4. In certain examples, the operations of block 925 may be performed by the resource scheduling component as described with reference to FIGS. 6 and 7.

Figure 10:
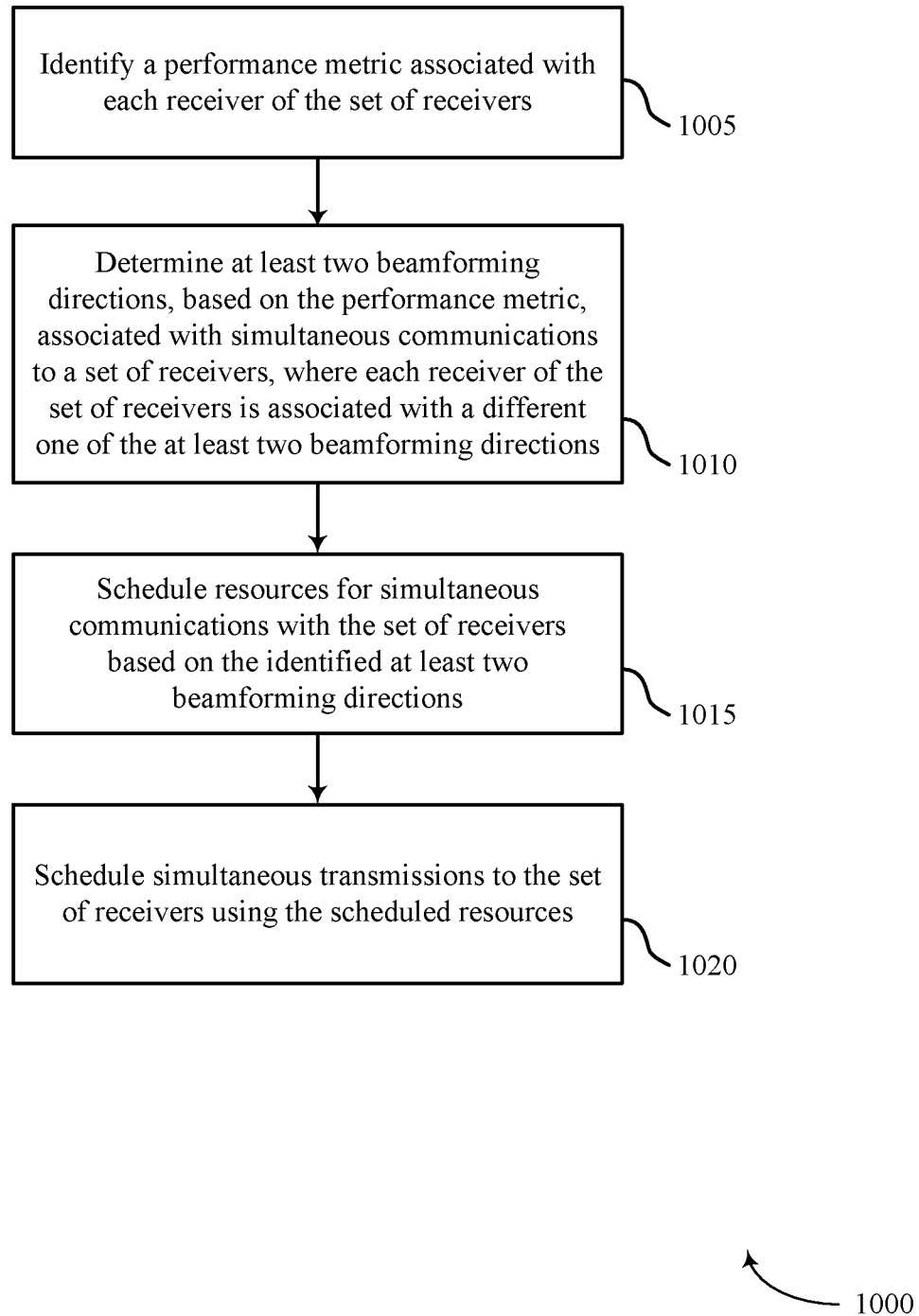

FIG. 10 shows a flowchart illustrating a method 1000 for multi-layer beamforming in millimeter-wave multiple-input/multiple-output systems in accordance with various aspects of the present disclosure. The operations of method 1000 may be implemented by a device such as a network access devices 105 (e.g., eNBs 105-a, ANCs 105-b, or RHs 105-c) and/or a base station 105-d, 105-e or its components as described with reference to FIGS. 1 through 3. More particularly, the operations of method 1000 may be implemented so as to schedule simultaneous transmissions to the set of receivers using the scheduled resources and/or a network access device 105 or its components as described with reference to FIGS. 1 through 4. For example, the operations of method 1000 may be performed by the communications manager as described herein. In some examples, the network access device 105 may execute a set of codes to control the functional elements of the device to perform the functions described below. Additionally or alternatively, the network access device 105 may perform aspects the functions described below using special-purpose hardware.

At block 1005, the network access device 105 may identify a performance metric associated with each receiver of the set of receivers as described above with reference to FIGS. 2 through 4. In certain examples, the operations of block 1005 may be performed by the performance metric component as described with reference to FIGS. 6 and 7.

At block 1010, network access device 105 may determine at least two beamforming directions, based on the performance metric, associated with simultaneous communications to a set of receivers, where each receiver of the set of receivers is associated with a different one of the at least two beamforming directions as described above with reference to FIGS. 2 through 4. In certain examples, the operations of block 1010 may be performed by the beamforming determining component as described with reference to FIGS. 6 and 7.

At block 1015, the network access device 105 may schedule resources for simultaneous communications with the set of receivers based on the identified at least two beamforming directions as described above with reference to FIGS. 2 through 4. In certain examples, the operations of block 1015 may be performed by the resource scheduling component as described with reference to FIGS. 6 and 7.

At block 1020, the network access device 105 may schedule simultaneous transmissions to the set of receivers using the scheduled resources as described above with reference to FIGS. 2 through 4. In certain examples, the operations of block 1020 may be performed by the resource scheduling component as described with reference to FIGS. 6 and 7.

Figure 11:
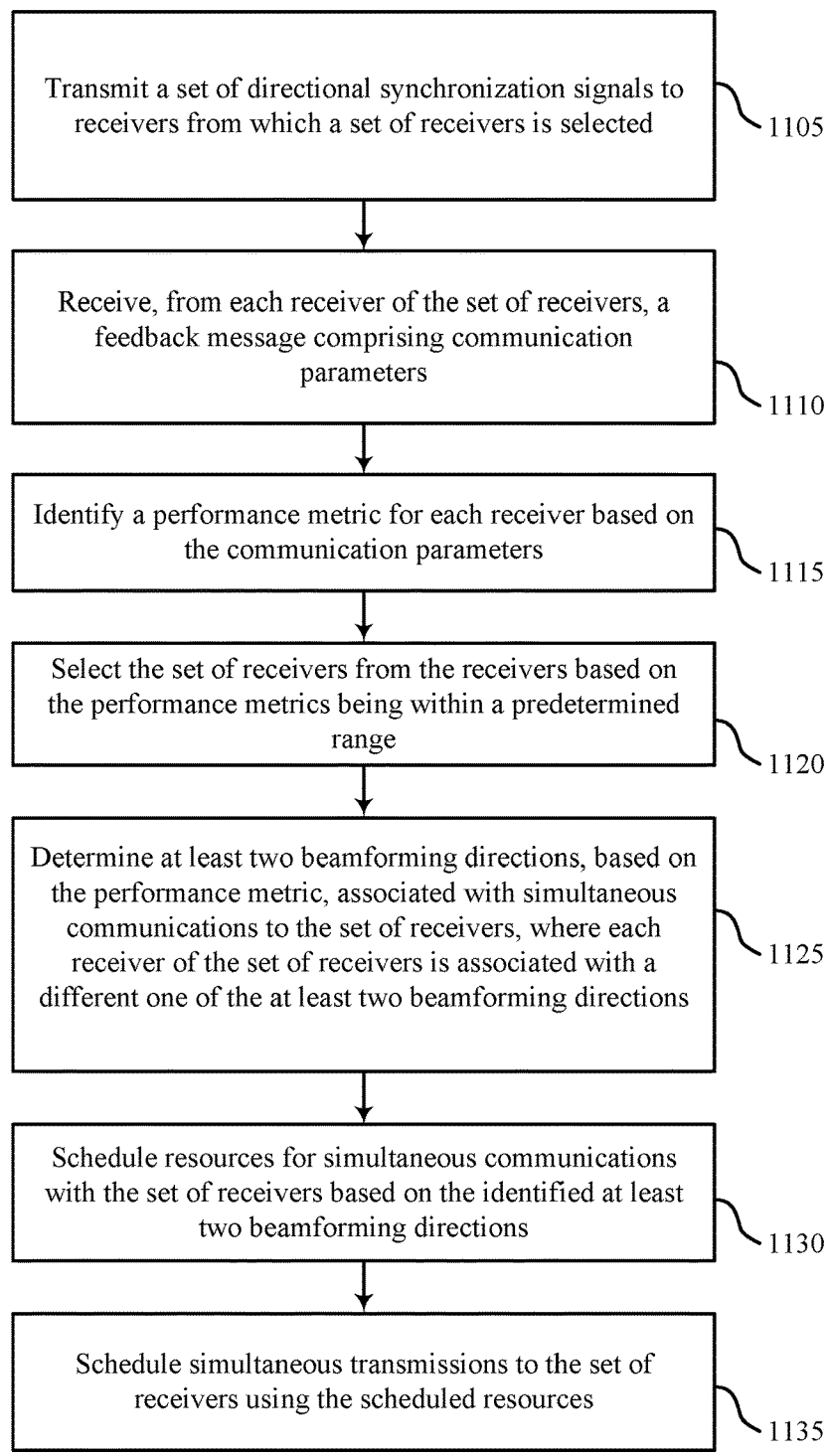

FIG. 11 shows a flowchart illustrating a method 1100 for multi-layer beamforming in millimeter-wave multiple-input/multiple-output systems in accordance with various aspects of the present disclosure. The operations of method 1100 may be implemented by a device such as a network access devices 105 (e.g., eNBs 105-a, ANCs 105-b, or RHs 105-c) and/or a base station 105-d, 105-e or its components as described with reference to FIGS. 1 through 3. More particularly, the operations of method 1100 may be implemented so as to schedule simultaneous transmissions to the set of receivers using the scheduled resources and/or a network access device 105 or its components as described with reference to FIGS. 1 through 4. For example, the operations of method 1100 may be performed by the communications manager as described herein. In some examples, the network access device 105 may execute a set of codes to control the functional elements of the device to perform the functions described below. Additionally or alternatively, the network access device 105 may perform aspects the functions described below using special-purpose hardware.

At block 1105, the network access device 105 may transmit a set of directional synchronization signals to receivers from which a set of receivers is selected as described above with reference to FIGS. 2 through 4. In certain examples, the operations of block 1105 may be performed by the performance metric component as described with reference to FIGS. 6 and 7.

At block 1110, the network access device 105 may receive, from each receiver of the set of receivers, a feedback message comprising communication parameters as described above with reference to FIGS. 2 through 4. In certain examples, the operations of block 1110 may be performed by the performance metric component as described with reference to FIGS. 6 and 7.

At block 1115, the network access device 105 may identify a performance metric for each receiver based on the communication parameters described above with reference to FIGS. 2 through 4. In certain examples, the operations of block 1115 may be performed by the performance metric component as described with reference to FIGS. 6 and 7.

At block 1120, the network access device 105 may select the set of receivers from the receivers based on the performance metrics being within a predetermined range as described above with reference to FIGS. 2 through 4. In certain examples, the operations of block 1120 may be performed by the performance metric component as described with reference to FIGS. 6 and 7.

At block 1125, the network access device 105 may determine at least two beamforming directions, based on the performance metric, associated with simultaneous communications to the set of receivers, where each receiver of the set of receivers is associated with a different one of the at least two beamforming directions as described above with reference to FIGS. 2 through 4. In certain examples, the operations of block 1125 may be performed by the beamforming determining component as described with reference to FIGS. 6 and 7.

At block 1130, the network access device 105 may schedule resources for simultaneous communications with the set of receivers based on the identified at least two beamforming directions as described above with reference to FIGS. 2 through 4. In certain examples, the operations of block 1130 may be performed by the resource scheduling component as described with reference to FIGS. 6 and 7.

At block 1135, the network access device 105 may schedule simultaneous transmissions to the set of receivers using the scheduled resources as described above with reference to FIGS. 2 through 4. In certain examples, the operations of block 1135 may be performed by the resource scheduling component as described with reference to FIGS. 6 and 7.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for multi-layer beamforming in millimeter-wave multiple-input/multiple-output systems.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for multi-layer beamforming in millimeter-wave multiple-input/multiple-output systems. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication comprising:
   determining at least two beamforming directions associated with simultaneous millimeter-wave (mmW) communications to a set of receivers, wherein each receiver of the set of receivers is associated with a different one of the at least two beamforming directions, and wherein each receiver of the set of receivers is associated with a different receiving device;

transmitting a plurality of directional synchronization signals to a plurality of receivers from which the set of receivers is selected;

receiving, from each receiver of the plurality of receivers and based at least in part on transmitting the plurality of directional synchronization signals, a feedback message comprising communication parameters, wherein the communication parameters comprise a data rate requirement;

identifying a performance metric associated with each receiving device based at least in part on the data rate requirement, wherein the performance metric is based on a transmit power metric associated with a signal-to-noise ratio (SNR) associated with each receiving device and a difference in respective beamforming direction metrics associated with angles of departure associated with communications to each receiving device;

selecting the set of receivers from the plurality of receivers based on the performance metrics being within a predetermined range, wherein the at least two beamforming directions are determined based on the performance metric associated with each receiving device;

scheduling the same time and frequency resources for the simultaneous mmW communications with the set of receivers based on the at least two beamforming directions; and scheduling simultaneous transmissions to the set of receivers using the scheduled resources.

2. The method of claim 1, wherein the communication parameters comprise at least one of a beamforming direction index value associated with one or more directional synchronization signals, an SNR associated with each receiver, or combinations thereof.

3. The method of claim 1, wherein transmitting the plurality of directional synchronization signals comprises:
reusing a same resource element (RE) for transmitting the plurality of directional synchronization signals from a plurality of transmitter antenna ports, and
wherein the communication parameters further comprise at least one of a receiver chain count value, a channel quality indicator (CQI), or combinations thereof.

4. The method of claim 1, wherein the performance metric is based on a difference in transmit power metric for each receiver being less than a first threshold value and based on the difference in the respective beamforming direction metrics being greater than a second threshold value.

5. The method of claim 1, further comprising:
transmitting a scheduling message to each receiver of the set of receivers, the scheduling message comprising an indication of the scheduled resources, wherein the scheduling message comprises a rank indicator (RI) associated with each receiver of the set of receivers.

6. An apparatus for wireless communication comprising:
means for determining at least two beamforming directions associated with simultaneous millimeter-wave (mmW) communications to a set of receivers, wherein each receiver of the set of receivers is associated with a different one of the at least two beamforming directions, and wherein each receiver of the set of receivers is associated with a different receiving device;

means for transmitting a plurality of directional synchronization signals to a plurality of receivers from which the set of receivers is selected;

means for receiving, from each receiver of the plurality of receivers and based at least in part on transmitting the plurality of directional synchronization signals, a feedback message comprising communication parameters, wherein the communication parameters comprise a data rate requirement;

means for identifying a performance metric associated with each receiving device based at least in part on the data rate requirement, wherein the performance metric is based on a transmit power metric associated with a signal-to-noise ratio (SNR) associated with each receiving device and a difference in respective beamforming direction metrics associated with angles of departure associated with communications to each receiving device;

means for selecting the set of receivers from the plurality of receivers based on the performance metrics being within a predetermined range, wherein the at least two beamforming directions are determined based on the performance metric associated with each receiving device;

means for scheduling the same time and frequency resources for the simultaneous mmW communications with the set of receivers based on the at least two beamforming directions; and means for scheduling simultaneous transmissions to the set of receivers using the scheduled resources.

7. The apparatus of claim 6, wherein the communication parameters comprise at least one of a beamforming direction index value associated with one or more directional synchronization signals, an SNR associated with each receiver, or combinations thereof.

8. The apparatus of claim 6, further comprising:
means for reusing a same resource element (RE) for transmitting the plurality of directional synchronization signals from a plurality of transmitter antenna ports, and
wherein the communication parameters further comprise at least one of a receiver chain count value, a channel quality indicator (CQI), or combinations thereof.

9. The apparatus of claim 6, wherein the performance metric is based on a difference in transmit power metric for each receiver being less than a first threshold value and based on the difference in the respective beamforming direction metrics being greater than a second threshold value.

10. The apparatus of claim 6, further comprising:
means for transmitting a scheduling message to each receiver of the set of receivers, the scheduling message comprising an indication of the scheduled resources, wherein the scheduling message comprises a rank indicator (RI) associated with each receiver of the set of receivers.

11. An apparatus for wireless communication, comprising:
a processor;
memory in electronic communication with the processor; and
instructions stored in the memory and operable, when executed by the processor, to cause the apparatus to:
determine at least two beamforming directions associated with simultaneous millimeter-wave (mmW) communications to a set of receivers, wherein each receiver of the set of receivers is associated with a different one of the at least two beamforming directions, and wherein each receiver of the set of receivers is associated with a different receiving device;

transmit a plurality of directional synchronization signals to a plurality of receivers from which the set of receivers is selected;

receive, from each receiver of the plurality of receivers and based at least in part on transmitting the plurality of directional synchronization signals, a feedback message comprising communication parameters, wherein the communication parameters comprise a data rate requirement;

identify a performance metric associated with each receiving device based at least in part on the data rate requirement, wherein the performance metric is based on a transmit power metric associated with a signal-to-noise ratio (SNR) associated with each receiving device and a difference in respective beamforming direction metrics associated with angles of departure associated with communications to each receiving device;

select the set of receivers from the plurality of receivers based on the performance metrics being within a predetermined range, wherein the at least two beamforming directions are determined based on the performance metric associated with each receiving device;

schedule the same time and frequency resources for the simultaneous mmW communications with the set of receivers based on the at least two beamforming directions; and schedule simultaneous transmissions to the set of receivers using the scheduled resources.

12. The apparatus of claim 11, wherein the communication parameters comprise at least one of a beamforming direction index value associated with one or more directional synchronization signals, an SNR associated with each receiver, or combinations thereof.

13. The apparatus of claim 11, wherein the instructions are operable to cause the processor to:

reuse a same resource element (RE) for transmitting the plurality of directional synchronization signals from a plurality of transmitter antenna ports, and wherein the communication parameters further comprise at least one of a receiver chain count value, a channel quality indicator (CQI), or combinations thereof.

14. The apparatus of claim 11, wherein the performance metric is based on a difference in transmit power metric for each receiver being less than a first threshold value and based on the difference in the respective beamforming direction metrics being greater than a second threshold value.

15. A non-transitory computer-readable medium storing code for wireless communication, the code comprising instructions executable to:

determine at least two beamforming directions associated with simultaneous millimeter-wave (mmW) communications to a set of receivers, wherein each receiver of the set of receivers is associated with a different one of the at least two beamforming directions, and wherein each receiver of the set of receivers is associated with a different receiving device;

transmit a plurality of directional synchronization signals to a plurality of receivers from which the set of receivers is selected;

receive, from each receiver of the plurality of receivers and based at least in part on transmitting the plurality of directional synchronization signals, a feedback message comprising communication parameters, wherein the communication parameters comprise a data rate requirement;

identify a performance metric associated with each receiving device based at least in part on the data rate requirement, wherein the performance metric is based on a transmit power metric associated with a signal-to-noise ratio (SNR) associated with each receiving device and a difference in respective beamforming direction metrics associated with angles of departure associated with communications to each receiving device;

select the set of receivers from the plurality of receivers based on the performance metrics being within a predetermined range, wherein the at least two beamforming directions are determined based on the performance metric associated with each receiver;

schedule the same time and frequency resources for the simultaneous mmW communications with the set of receivers based on the at least two beamforming directions; and schedule simultaneous transmissions to the set of receivers using the scheduled resources.

16. The non-transitory computer-readable medium of claim 15, wherein the communication parameters comprise at least one of a beamforming direction index value associated with one or more directional synchronization signals, an SNR associated with each receiver, or combinations thereof.

17. The non-transitory computer-readable medium of claim 15, wherein the instructions are executable to:

reuse a same resource element (RE) for transmitting the plurality of directional synchronization signals from a plurality of transmitter antenna ports, wherein the communication parameters further comprise at least one of a receiver chain count value, a channel quality indicator (CQI), or combinations thereof.

18. The non-transitory computer-readable medium of claim 15, wherein the performance metric is based on a difference in transmit power metric for each receiver being less than a first threshold value and based on the difference in the respective beamforming direction metrics being greater than a second threshold value.

19. The method of claim 1 wherein the same time and frequency resource used for the simultaneous mmW communications with each receiver of the set of receivers is not separated in time frequency or code domains.

20. The apparatus of claim 6 wherein the same time and frequency resource used for the simultaneous mmW communications with each receiver of the set of receivers is not separated in time frequency or code domains.

21. The apparatus of claim 11 wherein the same time and frequency resource used for the simultaneous mmW communications with each receiver of the set of receivers is not separated in time frequency or code domains.

22. The non-transitory computer-readable medium of claim 15, wherein the same time and frequency resource used for the simultaneous mmW communications with each receiver of the set of receivers is not separated in time frequency or code domains.

* * * * *